United States Patent Office 3,697,327
Patented Oct. 10, 1972

3,697,327
ELECTROLYTE FOR DRY BATTERIES AND DRY CELL BATTERIES USING SUCH ELECTROLYTE
Pierre Michel Rene Croissant, Smarves, Jean-Claude Armbruster, Poitiers, and Andree Chaumeau, Saint-Julien-l'Ars, France, assignors to Societe des Accumulateurs Fixes et de Traction (Societe Anonyme), Romainville, France
Filed Apr. 15, 1970, Ser. No. 28,787
Claims priority, application France, Apr. 22, 1969, 6912686; Jan. 29, 1970, 7003141
Int. Cl. H01m 9/04
U.S. Cl. 136—157                                      10 Claims

ABSTRACT OF THE DISCLOSURE

Electrolyte for dry cells and batteries of the Leclanché type embodying a salt solution of zinc chloride free from ammonium chloride and an organic gelling agent of reticulated granules of selected starches, the reticulated structure of the granules preventing liquefaction of the electrolyte and preventing leakage of said electrolyte, dry cells and batteries including such electrolyte and method of manufacturing dry cells and batteries embodying such electrolyte to improve operation and minimize production cost, as well as prevent leakage.

RELATED APPLICATION

A related application Ser. No. 786,989, filed Dec. 26, 1968 is copending, now Pat. 3,597,276.

BRIEF SUMMARY OF INVENTION

This invention relates to an electrolyte comprising a salt solution to which is added an organic gelling agent and intended for improving dry cells of the Leclanché type and batteries of such cells.

The electrolytes for dry zinc-manganese dioxide cells are generally constituted by solutions of zinc and ammonium chlorides to which are added organic gelling agents. For a very long time, the only changes undergone by such electrolytes have only concerned the gelling agents, with the exception of additions suggested for special conditions such as low temperature use. The mixture of chlorides to which a gelling agent was added had, according to the cooked gel method, to undergo a heating treatment for obtaining a stable gel. At the present time, the cold setting method consisting in increasing the concentration of metal chlorides, such as zinc chloride, and optionally calcium chloride, has made the omission of the cooking operation possible, since metal chlorides and more especially zinc chloride contained in the electrolyte in greater amounts have a marked gelling influence on the added organic material, thus rendering the cooking operation unnecessary.

However, it has been found, during the cell discharge, that, due to the effect of pH variations, and in a greater measure of the concentration of ammine-zinc ions, the electrolyte became liquefied and its volume increased, so that it had a tendency to escape from the cell container.

It has been suggested, more especially in the British Pat. 10,710, filed May 10, 1898, to use a salt solution containing only zinc chloride, which resulted in a decrease of the pH variations of the electrolyte; however, the results thus obtained have not been quite satisfactory.

In order to provide against this electrolyte leakage, it has been suggested long ago to enclose the cell in a jacket containing materials for absorbing the oozing electrolyte. Thus, the U.S. Pat. No. 2,748,183 of May 1956, in order to increase the eelctrolyte absorption, suggests the use as gelling agent of starches processed in a particular manner which inhibits gelatinization, thus conferring to the electrolyte liquefied during the cell discharge, a fluidity promoting its absorption by the materials placed in the cell jacket.

During the researches undertaken for removing the causes of the electrolyte leakage occurring during the cell discharge, it has surprisingly been found that such starches processed so that they present a reticulated structure, used with special salt solutions, wholly prevented the liquefaction of the electrolyte.

An object of the invention is the provision of a gellified electrolyte of high stability for dry zinc-manganese dioxide cells comprising a salt solution to which is added a gelling agent, wherein the gelling agent consists of starches with reticulated granules so that the swelling of of the granules in aqueous solution is decreased and stabilized and wherein the salt solution is a zinc chloride solution free from ammonium chloride.

This stabilization of the structure results in preventing the bursting of the granules, not only during the formation of the gel, but also and above all during the operation of the corresponding dry cells.

Another object of the invention is the provision of a dry cell of the zinc manganese dioxide type having such an electrolyte, as well as a battery of such cells.

Other objects and features of the invention will become apparent from the following detailed description and the accompanying drawings, wherein.

DETAILED DESCRIPTION

Figure 1:
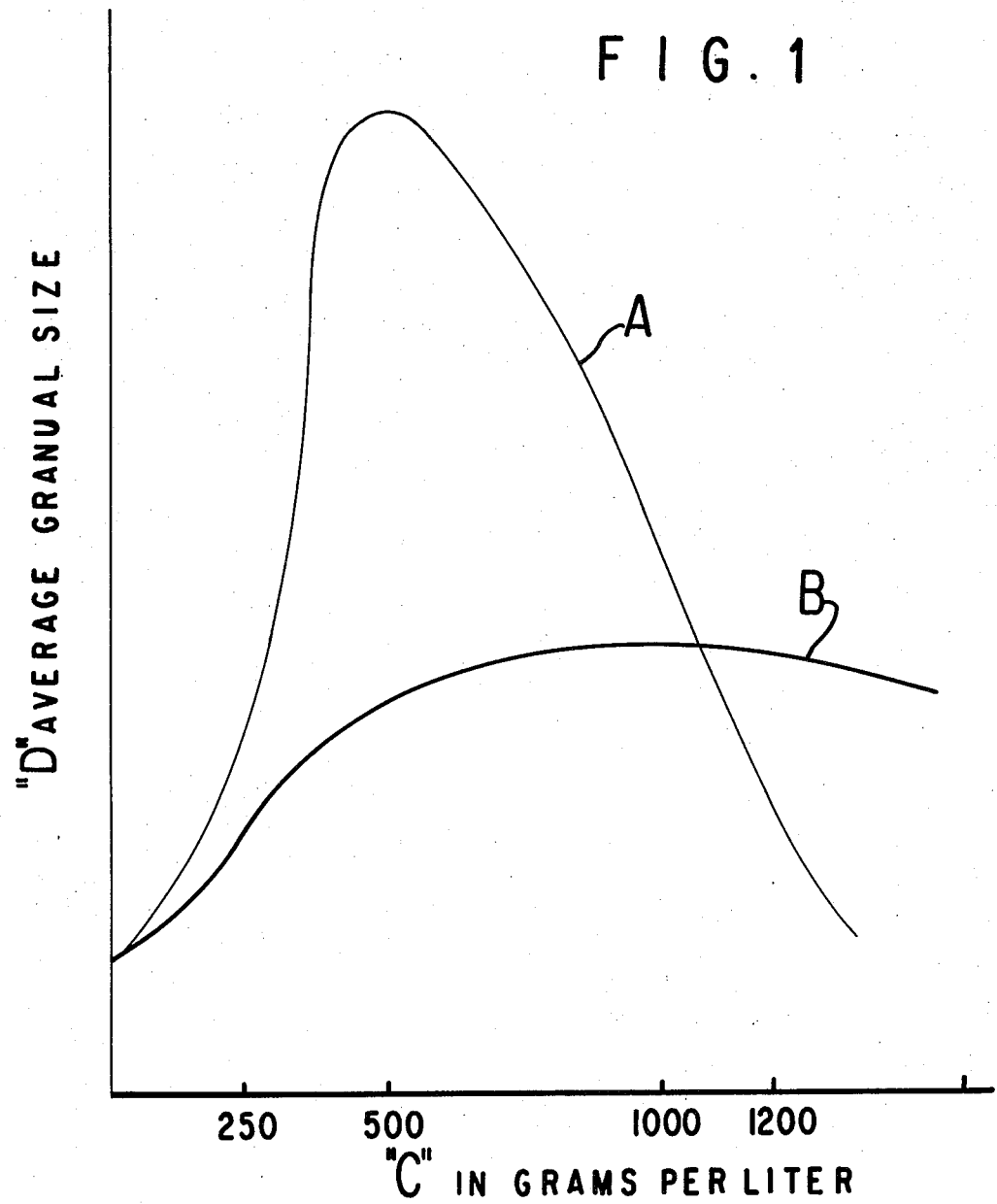
FIG. 1 is a graph depicting comparative properties between an ordinary starch and one which has undergone the reticulating process.

The processing of starches in order to give them a reticulated structure may, for instance, make use of the reactives which form an ether with the two hydroxyl groups of starch. A reticulation of starch molecules is obtained in this way. One of the most important reactives used for this known process is epichlorhydrin, but for this reactive formaldehyde, acrolein, phosphorus oxychloride, etc., may be substituted. This process may be carried out in such a way that its effect on the swelling and stabilization of granules are more or less marked.

The above-mentioned U.S. Pat. No. 2,748,183 discloses a method for determining the degree of intensity or extent of the starch processing: e.g. 5 g. of the processed starch are mixed with 100 ml. of water and heated for a period of about 20 minutes at about 100° C. The mixture is then left to stand for about 24 hours and the degree of processing is estimated from the volume of starch which has settled out.

According to a characteristic of the invention, the electrolyte is constituted by an aqueous zinc chloride solution comprising 300 to 900 g./l. of zinc chloride to which are added 200 to 600 g./l. of reticulated starch. Such starch may, for instance, be corn or potato starch or else be a mixture of starches from various origins.

Advantageously, the starches are processed for their reticulation in such a way that the settled volume is about 30 to 50 ml. in the above-described 24-hour test. Starches having undergone a stronger processing can also give good results, but they require a longer gelling time, which makes their application somewhat more difficult.

For illustration purposes but not limitatively, it is specified that good results have been obtained with an electrolyte constituted by an aqueous solution of 450 g./l. zinc chloride to which are added 220 g./l. of starch with a reticulated structure, this starch embodying about 32% derived from corn starch with reticulated structure (this fraction giving a 44 ml. volume of settled material in the above noted test) and about 68% derived from potato starch with a reticulated structure (this fraction giving a 37 ml. volume of settled material in the above-noted test).

This mixture gelatinizes in about four minutes. With such an electrolyte, a cell can be discharged without any liquefaction of the gelatinized electrolyte, and without any leakage occurring even when the cell casing is not leakproof. Besides, it is easy to use since the gelatinizing time is sufficiently rapid, this being the reason why reticulated corn starch and reticulated potato starch have been mixed since their gelatinization times are different.

Obviously, other starches such as, for instance, wheat or rice starches which can be processed in the same way in order to obtain a reticulated structure, can also be used either alone or mixed together, provided that their properties are similar (gelatinization time, settled volume in the above-noted test, and so on).

Another manner of influencing the gelatinization time is to vary the zinc ion concentration.

The unexpected results thus obtained may be explained by reference to FIG. 1 which diagrammatically shows the variation of the average size of a potato starch granule as a function of the zinc chloride concentration of the solution wherein the starch is immersed. The average granule size D has been plotted as ordinates and the zinc chloride concentration C in grams per liter, as abscissae.

Curve A illustrates use in the zinc chloride solution of a non-processed starch and curve B relates similarly to use of processed starch with a reticulated structure.

It should be noted that similar curves would be obtained for other starches, with a possible shifting of the zinc chloride content relative to the curve peak.

As shown by the curve B of the diagram of FIG. 1, when the zinc chloride content increases, the variation of the average size of the processed starch granules is smaller than that of the non-processed starch granules (curve A); the resulting gel is, therefore, less influenced by the zinc chloride concentration.

The result would be similar if the zinc chloride content was not increased, but if instead zinc ions were added, such as those provided by the discharge of the cell wherein zinc is oxidized. In such case, the phenomenon may be still more important since, as is now known, the zinc ions have a strong tendency to being solvated, thus extracting water from the gelling agent. This competition for water between the gelling agent and the zinc ions, where the action of zinc ions prevails, results in breaking up the gel structure.

The optimum concentration of a gel is obtained when the starch granules, after absorbing the solution, are in close contact with each other as a consequence of swelling and substantially no liquid remains between the granules. For a 500 g./l. zinc chloride solution, for instance, different amounts of starch will be chosen for obtaining the optimum gel, depending on the quality of starch, either natural or processed for reticulation. The amount of natural starch will obviously be lower than the amount of processed reticulated starch, since natural starch has its maximum swelling for the said 500 g./l. concentration of the solution and this swelling is much more important than that of processed starch as may be seen on the diagram. Two dry cells are therein compared, both having these optimum electrolyte compositions as to gelatinization, one with natural starch (curve A) and the other with reticulated processed starch (curve B).

As long as these two cells remain in open circuit the composition of the electrolytes does not vary and the gels remain stable. But as soon as the cells are put in discharge the oxidation of the zinc negative electrode introduces zinc ions into the electrolytes, so that their concentrations are shifted towards higher values. Since the electrolyte prepared with natural starch was in its maximum swelling state for 500 g./l. (peak of curve A), the granules will then give up water which will result in breaking up the gel structure, this water being used for solvating zinc ions, and liquid electrolyte will appear, its amount increasing as the discharge proceeds. On the contrary, as seen from curve B, the swelling of the processed starch with reticulated structure remaining practically the same even for increasing concentrations of zinc ions, the processed starch granules remain close together and the solution always remain completely absorbed in the gel. The cell prepared with natural starch will leak, due to the liquefaction of the gelatinized electrolyte, whereas the cell prepared with processed starch with reticulated structure will not leak at all, since its electrolyte will remain gelatinized.

Such cells with processed starch have given excellent results for high drains, being much better than those with cells with a conventional electrolyte used under the same conditions.

The electrolyte according to the invention also may advantageously be used for simplifying the structure of dry cells and dry batteries existing at the present time.

At present, the flat cell batteries of the zinc manganese dioxide type are obtained by piling up the flat cell components in perforated cups or the like, such components being a zinc negative electrode coated with a conductive varnish on it face in contact with the cup, a separator, and a depolarizer mass, the said cups then being stacked, e.g. by nesting them in each other, and then compressing the thus built-up stack.

The main use of the cups is so that their lateral walls make up a sheath for the flat components, such sheath being used for preventing the electrolyte liquefied during discharge from leaking from each cell to another and thus short-circuiting the stacked cells.

According to the present invention, however, when a dry battery of flat cells of the zinc-manganese dioxide type is used with the novel electrolyte disclosed herein containing the processed starch, it is possible to omit the cups without leakage occurring, thus obtaining a substantial simplification in the manufacture of such batteries and a marked lowering of their manufacturing costs.

A battery made according to the invention, using the novel electrolyte disclosed herein can, therefore, be obtained by successively stacking a wafer-like zinc electrode coated on its downward face with a conductive varnish, a wafer-like separator and a depolarizer mass, another coated wafer-like zinc electrode, and so on, to form the desired number of cells in the battery and also then providing means for maintaining the components of this stack under pressure.

According to the invention, the zinc chloride solution free from ammonium chloride is introduced in the depolarizer mass while the latter is being prepared.

It is then advantageous to increase the usual content of carbon black in this mass so that the depolarizer mass provides for a better retention of the zinc chloride solution during the battery construction. Thus, the carbon black content of the mass may be increased to about 9% (by weight) whereas it usually is only about 7% (by weight) in conventional structures.

According to the invention, the reticulated starch, in a non-gelatinized state, is pasted as a layer on the wafer-like separators, preferably on both faces of these separators, the zinc chloride solution constituting part of the electrolyte being solely provided by that introduced into the depolarizer mass.

The reticulated starch content may reach from 300 to 600 g./l. in the separator zones after diffusion into such zones of the zinc chloride solution provided by the respective depolarizer masses.

Figure 2:
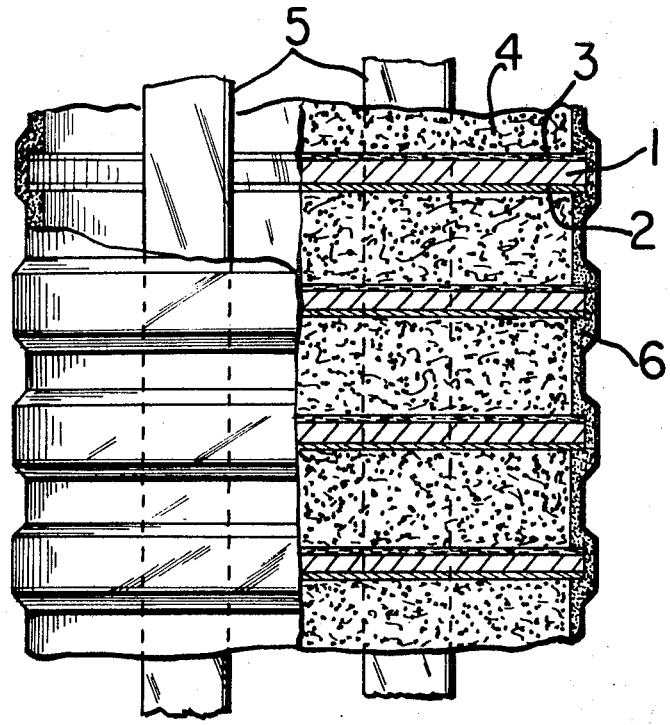
FIG. 2 is a diagrammatic partially sectionalized fragmentary elevational view of a battery in accord with this invention.
Figure 3:
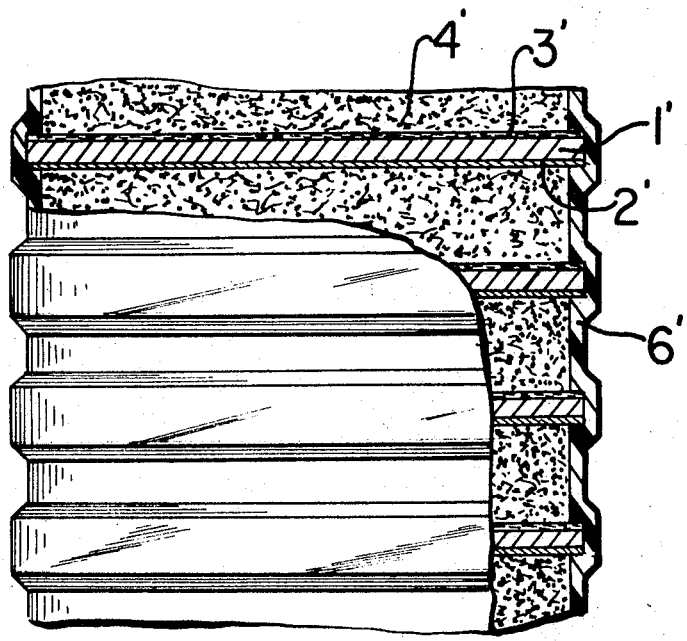
FIG. 3 is a similar view of a modified form of such battery.

The span dimensions of the wafer-like separator and those of the wafer-like negative electrode coated with conductive varnish are substantially alike (see FIGS. 2 and 3).

Advantageously as seen in these figures, however, the span dimensions of each depolarizer mass is slightly lower than that of the wafer-like negative electrode.

The means used for maintaining the stack components under pressure as a unit may be constituted, for example, by adhesive strips. This stack may thereafter be coated with an external layer of insulative microcrystalline wax or similar material mainly intended for preventing evaporation of the electrolyte from the unit during battery storage.

If this unit is to be put in a metal casing, it may be also covered with a further thin sheet of plastic material or paraffined paper (not shown) thus ensuring its electrical insulation from the casing.

FIG. 2 diagrammatically shows a half-sectional front view with partial breaking away on the left side, of a dry battery according to one embodiment of the invention.

The wafer-like negative zinc electrode 1 is coated on its downward face with a conductive varnish 2 and bears on the other face a depolarizer mass 4 containing the zinc chloride solution imbibed therein; a wafer-like separator 3 made e.g. of kraft paper, coated preferably on both faces with layers of reticulated starch is positioned to lie between the upward face of electrode 1 and the adjacent depolarizer mass 4. In succession, these components are superposed to form a stack of desired number of cells.

The stack thus formed is then put under pressure as by means of adhesive strips 5. It is then coated with an external layer 6 of protective microcrystalline insulative wax.

As an illustrative and non-limitative example, the zinc chloride solution content of the depolarizer may be about 30% (by volume), the zinc chloride solution containing about 450 g./l. zinc chloride.

In some special cases as seen in FIG. 3, the means used for maintaining the stack of dry cells under pressure may be constituted by an extensible plastic sheath 6', e.g. made of polyvinyl chloride, having smaller dimensions than those of the stack before it is put in its place, which is stretched for mounting over the stack and then allowed to contract to original dimensions. This sheath may be further shrunk by partial deplasticification to effect further compression together of the stack components.

Thus it is possible to use a sheath similar to that described in the copending U.S. application Ser. No. 786,989 filed Dec. 26, 1968.

Applying the sheath of the said application to the stack may be effected by the method described in the said application, e.g. by first stretching it to large dimensions to facilitate mounting, then releasing the stretched sheath to allow it to contract to original dimensions and, thereafter, further shrinking the sheath as by partial deplasticification.

In this FIG. 3, the cell components, namely, zinc negative electrodes 1' coated with conductive varnish 2' on one face bears on its other face a depolarizer mass 4' containing the zinc chloride solution of the same content previously mentioned and a wafer-like separator 3' e.g. of kraft paper coated on both faces with layers of reticulated starch of the type described is positioned to lie between the upward face of electrode 1' and the adjacent depolarizer mass 4'. The stack thus formed has its components put under compression by application thereto of the stretched plastic sheath 6' which on contraction from stretched condition as described and optional further shrinking by partial deplasticification as noted above effects such compression. Thereafter, if desired, a protective metal casing (not shown) may be mounted over the compressed unit.

While specific embodiments of the invention have been described, variations within the scope of the appended claims are possible and are contemplated, there being no intention of limitation to the exact details herein described and shown.

What is claimed is:

1. A gelatinized electrolyte for a dry zinc manganese dioxide cell consisting of an aqueous salt solution and an added organic gelling agent, the gelling agent consisting of granules of reticulated starch so that swelling of said granules in aqueous solution is decreased and stabilized and the salt solution consisting of an aqueous zinc chloride solution free of ammonium chloride, which contains from about 300 to 900 g./l. zinc chloride in water.

2. An electrolyte according to claim 1, wherein the reticulated starch is present in the amount of from 200 to 600 g./l.

3. An electrolyte according to claim 2 wherein the reticulated starch is processed to the extent that a mixture of 5 g. of the processed starch with a 100 ml. of water heated for about 20 minutes at about 100° C. gives a 35 to 45 ml. volume of settled material after about a 24 hour stand.

4. An electrolyte according to claim 3 which is constituted by an aqueous solution consisting of 450 g./l. of zinc chloride and 200 g./l. of processed reticulated starch.

5. An electrolyte according to claim 3 wherein the reticulated starch is derived for about 32% corn starch and for about 68% from potato starch, the corn starch fraction giving about 44 ml. volume of settled and the potato starch fraction giving approximately a 37 ml. volume of settled material.

6. A dry cell of the zinc-manganese dioxide type which comprises gelatinized electrolyte consisting of an aqueous salt solution and an added organic gelling agent, the gelling agent consisting of granules of reticulated starch so that the swelling of said granules in said aqueous solution is decreased and stabilized and the aqueous salt solution consisting of an aqueous zinc chloride solution free of ammonium chloride, which contains from about 300 to 900 g./l. of zinc chloride in water.

7. A dry cell according to claim 6, wherein the reticulated starch is present in amounts of from about 200 to 600 g./l.

8. A dry cell according to claim 6, wherein said starch is processed to the extent that a mixture of 5 g. of the processed starch with a 100 ml. of water heated for about 20 minutes at about 100° C. gives a 35 to 45 ml. volume of settled material after about a 24 hour stand.

9. A dry cell according to claim 6 wherein the gelatinized electrolyte consists of an aqueous solution of 450 g./l. of zinc chloride and 220 g./l. of processed reticulated starch.

10. A dry cell according to claim 9 wherein the reticulated starch is derived for about 32% from corn starch and for about 68% from potato starch, the corn starch fraction giving about 44 ml. volume of settled material and the potato fraction about a 37 ml. volume of settled material.

References Cited

UNITED STATES PATENTS

| | | | |
|---|---|---|---|
| 2,748,183 | 5/1956 | Welsh et al. | 136—157 |
| 3,019,141 | 1/1962 | Priebe | 136—157 |
| 1,518,638 | 12/1924 | Olaneta | 136—157 |

OTHER REFERENCES

Helfrecht et al., Gelatinization of Corn Starch in Dry Cell Electrolytes, Electrochemical Society, meeting, Apr. 26, 1928, vol. 53, pp. 93, 96, 97 and 98.

DONALD L. WALTON, Primary Examiner

U.S. Cl. X.R.

136—158